United States Patent [19]
Mitchell

[11] 3,856,286
[45] Dec. 24, 1974

[54] TORSION BAR PLATE
[75] Inventor: William Mitchell, Baldwin, N.Y.
[73] Assignee: Motion Mini Car Corp., Baldwin, N.Y.
[22] Filed: June 12, 1973
[21] Appl. No.: 369,311

[52] U.S. Cl. ................................................. 267/57
[51] Int. Cl. ............................................... F16f 1/16
[58] Field of Search ...................................... 267/57

[56] References Cited
UNITED STATES PATENTS
2,845,279   7/1958   Polhemus et al. .................... 267/57
3,096,085   7/1963   Owens ................................... 267/57

Primary Examiner—James B. Marbert
Attorney, Agent, or Firm—Holland, Armstrong, Wilkie & Previto

[57] ABSTRACT

A torsion bar plate mounted on the chassis of an automobile and having an opening to support a torsion bar.

2 Claims, 5 Drawing Figures

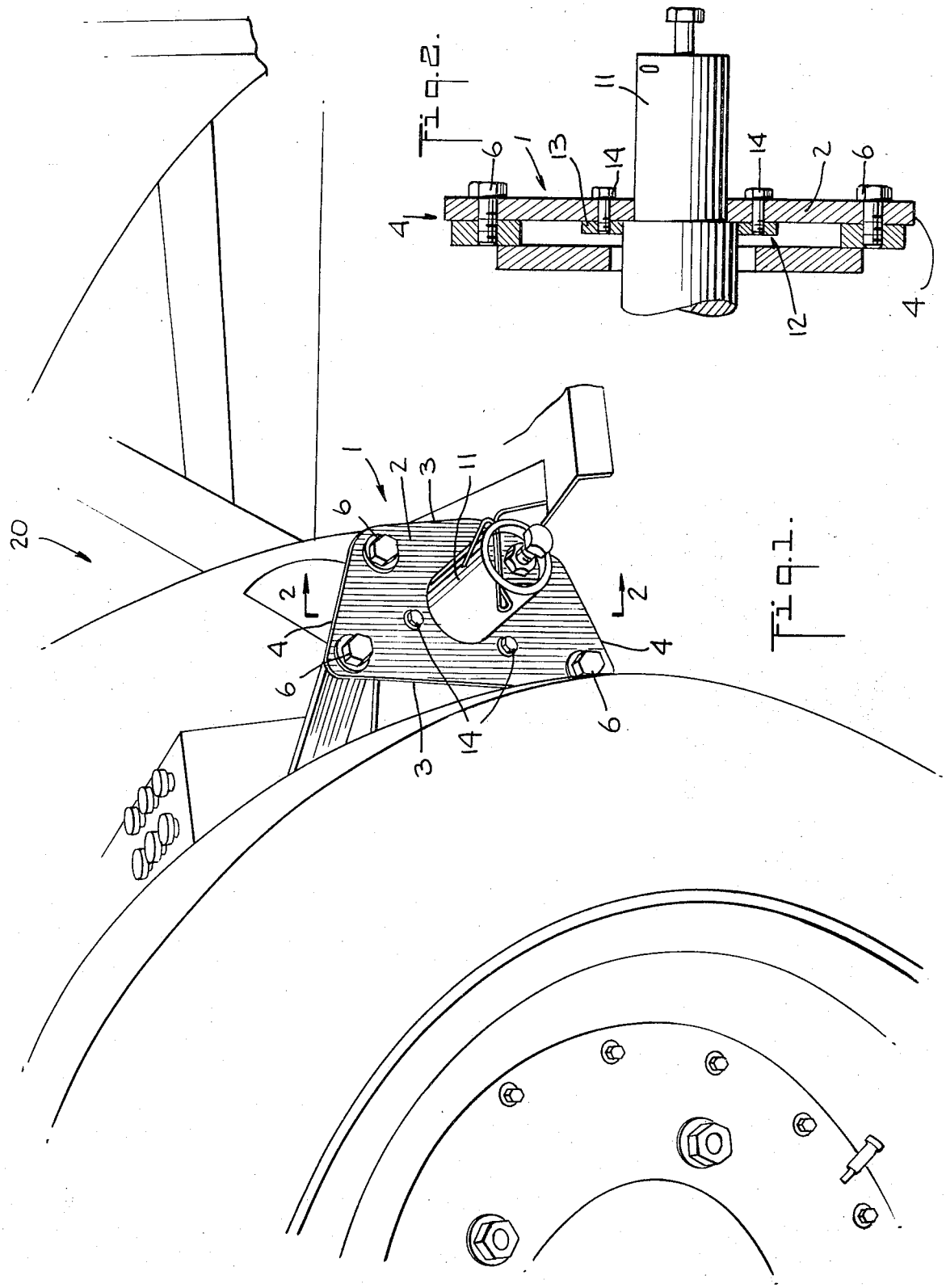

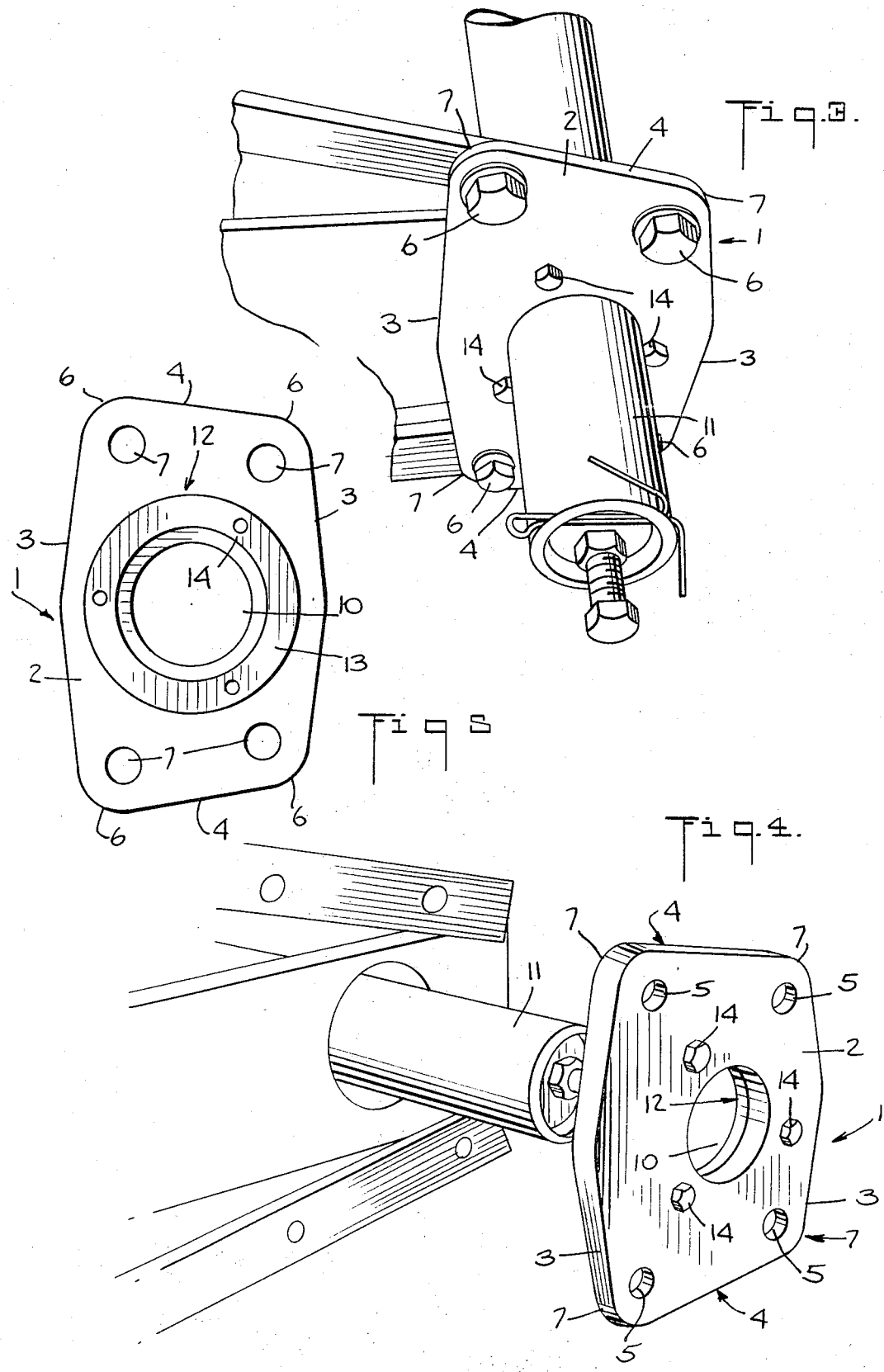

TORSION BAR PLATE

DESCRIPTION

The present invention is directed to an improved torsion bar mounting and more particularly to an improved torsion bar plate.

Heretofore, torsion bars for automobile suspensions have been mounted on rubber bushings. It has been found that such rubber bushings tend to wear out by the action of the torsion bar and must be replaced at regular intervals, otherwise they tend to give uneven suspension.

In addition, if the bushings do wear out, the torsion bar may be damaged.

Furthermore, if the bushings wear unevenly, a dangerous condition may be created.

The present invention overcomes these defects and comprises an improved torsion bar suspension system which eliminates the drawbacks outlined above and has for one of its objects an improved plate for a torsion bar in which wear is minimized.

Another object of the present invention is the provision of an improved torsion bar mechanism which may be easily mounted on the suspension system.

Another object of the present invention is the provision of an improved torsion bar plate which may be easily added to existing torsion bar systems.

Another object of the present invention is the provision of an improved torsion bar plate used for supporting the torsion bar.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a diagrammatic perspective view showing the improved torsion bar plate of the present invention in place on an automobile;

FIG. 2 is a sectional view shown along line 2—2 of FIG. 1;

FIG. 3 is a detail view thereof;

FIG. 4 is an exploded view of the plate of the present invention; and

FIG. 5 is a plan view thereof.

Referring more particularly to the drawings, the improved plate 1 comprises a flat body portion 2 having a plurality of side edges 3 and end edges 4. Openings 5 for bolts 6 are provided for each of the four corners 7 formed by the intersection of the side and end edges 3 and 4.

A circular substantially centrally located opening 10 is provided in plate 1 which is adapted to accommodate the torsion bar 11. The plate assembly 1 is provided with a spacer unit assembly 12 mounted around the opening 10. This is in the form of a ring 13 bolted to the body 2 of the plate 1 by a plurality of bolts 14. The plate body 2 may be machined or may be cast and the spacer ring 13 may be mounted on the plate body 2 thereafter bolts 14.

The torsion bar plate assembly 1 may be mounted on the automobile frame 20 as shown in the drawings. The torsion bar 11 shown in the drawings is in the form of a round bar which extends through the chassis of the automobile 20 and which is adapted to have a twisting action to give the proper suspension as is well known in the trade.

In the particular automobile shown in the drawings, the torsion bar 11 and the plate assembly 1 are mounted adjacent the wheel 21. The plate assembly 1 is mounted on the chassis of the automobile by means of the four bolts 6 in the corners 7 with the torsion bar 11 extending through the central opening 10.

The torsion bar 11 is adapted to bear on the spacer ring 13 which applies pressure on the torsion bar plate 1. The plate 1 is preferably placed on the outside of the torsion bar housing (not shown) so that it does not interfere with the torsion bar action.

With this particular construction, the torsion bar plate 1 which is made of a rigid metal will support the torsion bar 11 but the wear and tear on the plate will be minimized.

Hence, it will be seen that the present invention comprises an improved torsion bar suspension system which eliminates the drawbacks of present systems in which wear is minimized and may be easily added to present automobiles using rubber bushings.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described the invention, it is claimed:

1. A torsion bar assembly comprising a torsion bar, a torsion bar plate, means for supporting said torsion bar on said torsion bar plate means for supporting the torsion bar plate on a frame, said torsion bar plate comprising a substantially flat plate having an opening therein to support the torsion bar, said torsion bar plate also comprising end edges and side edges, bolt openings being provided in the corners formed by the edges, said bolt opening being adapted to accommodate means for mounting the plate at same frame, a spacer assembly is provided around the opening, said opening is located substantially centrally on said plate, said spacer assembly being a ring removably bolted to the plate around the opening.

2. A torsion bar plate comprising a substantially flat plate having an opening therein to support a torsion bar, said torsion bar plate comprising end edges and side edges and openings being provided in the corners formed by the edges, a spacer assembly being provided around the opening, said opening being located substantially centrally on said plate, and said spacer assembly being a ring removably bolted to the plate around the opening.

* * * * *